(12) United States Patent
Xu

(10) Patent No.: US 6,318,348 B1
(45) Date of Patent: Nov. 20, 2001

(54) STRATIFIED EXHAUST GAS RECIRCULATION STRATEGY FOR INTERNAL COMBUSTION ENGINE

(75) Inventor: Min Xu, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/591,635

(22) Filed: Jun. 8, 2000

(51) Int. Cl.[7] .............................. F02M 25/07; F02B 47/08
(52) U.S. Cl. .................... 123/568.14; 123/308; 123/430; 123/90.15
(58) Field of Search ..................... 123/295, 305, 123/308, 430, 432, 568.11, 568.14, 90.15, 90.11, 90.16

(56) References Cited

U.S. PATENT DOCUMENTS

| | | | |
|---|---|---|---|
| 4,354,463 | * 10/1982 | Otani et al. | 123/568.14 |
| 4,393,853 | 7/1983 | Groves | 123/568.11 |
| 4,700,684 | 10/1987 | Pischinger et al. | 123/568.14 |
| 4,870,941 | 10/1989 | Hisatomi | 123/676 |
| 4,905,646 | * 3/1990 | Tanahashi | 123/568.14 |
| 5,005,552 | 4/1991 | Kawamura | 123/568.14 |
| 5,255,641 | 10/1993 | Schechter | 123/90.11 |
| 5,379,743 | 1/1995 | Stokes et al. | 123/568.18 |
| 5,405,844 | 4/1995 | Schechter | 123/90.12 |
| 5,592,906 | 1/1997 | Kreuter et al. | 123/90.16 |
| 5,640,941 | 6/1997 | Hazen et al. | 123/306 |
| 5,653,202 | 8/1997 | Ma | 123/184.43 |
| 5,692,463 | 12/1997 | Liang et al. | 123/90.11 |
| 5,743,221 | 4/1998 | Schmitz | 123/90.11 |
| 5,765,525 | 6/1998 | Ma | 123/308 |
| 5,870,993 | 2/1999 | Stellet et al. | 123/308 |
| 5,894,826 | 4/1999 | Jaye | 123/295 |
| 5,915,354 | 6/1999 | Ma | 123/308 |
| 5,918,577 | 7/1999 | Martelli et al. | 123/295 |
| 5,927,238 | 7/1999 | Watson et al. | 123/90.15 |
| 5,960,755 | 10/1999 | Diggs et al. | 123/90.15 |

* cited by examiner

*Primary Examiner*—Willis R. Wolfe
(74) *Attorney, Agent, or Firm*—John E. Kajander; Larry Shelton

(57) ABSTRACT

A four-stroke reciprocating internal combustion engine that uses stratified exhaust gas recirculation to improve combustion is disclosed. The engine includes at least one combustion chamber defined by a cylinder, a reciprocating piston contained within the cylinder, and a cylinder head. Each combustion chamber is in fluid communication with at least one intake port and at least one exhaust port. At least one intake port includes an associated intake valve, an intake flow motion generating device and an associated intake flow direction control device for creating an intake fluid flow near the center of the cylinder. At least one exhaust port includes an exhaust valve that opens during the intake stroke at part load, an exhaust flow motion generating device and an associated exhaust flow direction control device for creating an exhaust fluid flow near the outer periphery of the combustion chamber during the intake stroke at part load. An engine controller processes signals from at least one sensor and outputs a control signal to a variable valve lift and timing system for operating each intake valve and each exhaust valve such that an exhaust residual flow is inducted through at least one exhaust port into the combustion chamber and air or an air/fuel mixture is simultaneously inducted through at least one intake port into the combustion chamber. If air is inducted into chamber, fuel is directed into the air in the chamber. The engine produces a stratified exhaust gas and air-fuel mixture that includes recirculated exhaust gas which rotates about the cylinder axis and remains substantially along an interior wall of the cylinder and a stoichiometric air-fuel mixture which rotates about the cylinder axis and occupies a portion of the piston surface and the remaining portion of the combustion chamber. Because of the stoichiometric operation of the engine, conventional three-way catalysts can be used for emission control.

38 Claims, 6 Drawing Sheets

STRATIFIED EXHAUST GAS RECIRCULATION STRATEGY FOR INTERNAL COMBUSTION ENGINE

BACKGROUND OF THE INVENTION

1. Field of the Invention

This invention relates to a four-stroke reciprocating piston internal combustion engine in which a portion of the exhaust gas is selectively recirculated and added to the cylinder along with fuel and air to create a stratified exhaust gas/air-fuel mixture within the combustion chambers.

2. Description of the Related Art

It is well known that many spark-ignition four-stroke reciprocating piston internal combustion engine designs have a lower efficiency at low/partial load. The loss of efficiency is caused by a number of factors including: losses due to the throttling of the intake mixture, slow combustion due to lower density of the throttled mixture, and excessive heat loss to the combustion chamber walls. In addition to low efficiency at low/partial load, some engines emit unacceptable levels of nitrogen oxides (NOx) and hydrocarbons (HC) during partial-load operation.

Engine designs that use exhaust gas recirculation (EGR) have been developed as one solution to the efficiency and emission problems associated with low/partial load operation. It has been well documented that the use of exhaust gas recirculation in engines provides some reduction in throttling losses and significant reductions in engine NOx emissions because the peak combustion temperature is reduced. It is also known that exhaust gas recirculation can be used with stoichiometric air-fuel mixtures to allow the use of conventional three-way catalysts for effective exhaust emission control.

A number of engine configurations that implement exhaust gas recirculation are known in the art. For example, in U.S. Pat. No. 4,870,941 there is disclosed a basic type of an engine EGR system wherein the engine exhaust manifold is placed in fluid communication with the intake manifold by way of an EGR passage. In this configuration, exhaust gas is recirculated or fed back to the intake manifold through the EGR passage and an EGR valve. Another type of engine EGR system is disclosed in U.S. Pat. No. 5,404,844 wherein a first portion of the exhaust gas in an upper portion of the cylinder is expelled into an exhaust port and a second portion of the exhaust gas from a lower portion of the cylinder is expelled into an intake port for subsequent reintroduction into the cylinder from the intake port during the intake stroke. Yet another type of engine EGR system is disclosed in U.S. Pat. No. 5,005,552 wherein exhaust gas is recirculated into the cylinder by opening the exhaust valve during the intake stroke thereby drawing a backflow of exhaust gas into the cylinder.

Engines that use charge stratification have been developed as another solution to the efficiency and emission problems associated with low/partial load operation. In a typical stratified charge spark ignition engine, the air/fuel mixture is deliberately delivered to the cylinder in a non-homogeneous fashion to produce a small kernel of a relatively rich mixture at the spark plug while the remainder of the air/fuel mixture is relatively lean. As the rich mixture ignites, it in turn ignites the lean mixture in the combustion chamber. In such engines, therefore, the air/fuel mixture can be burned completely even if the air/fuel mixture, as a whole, is lean. Accordingly, fuel economy is improved and regulated gaseous emissions, such as carbon monoxide and NOx, that are contained in the exhaust of the engine can be reduced. However, engines using charge stratification methods typically require special expensive lean NOx trap catalysts for emission control, and therefore have not achieved widespread use.

The charge stratification may take place in different ways within the combustion chamber. The common forms of stratification are axial stratification in which the fuel is concentrated at the top of the combustion chamber and radial stratification in which the fuel is concentrated near the central axis of the combustion chamber. Other forms of stratification are created by causing the intake charge to tumble, that is to say rotate about an axis perpendicular to the cylinder axis. Such motion is not to be confused with swirl in which gases rotate about the axis of the cylinder, the latter normally resulting in radial stratification. When tumble is promoted in the intake charge, stratification can occur in one of two ways. In one way, if the composition of the gases varies across the width of the combustion chamber, a sandwich-like structure with vertical layers is created that is referred to as vertical stratification, the vertical direction being taken as the axis of reciprocation of the piston. In the other form of stratification produced by tumble, which is termed envelope stratification, the tumble produces a horizontal cylinder of one composition enveloped in a second outer layer having a different composition, the two layers tumbling in unison at right angles to the cylinder axis.

In order to produce radial stratification, the gases entering the combustion chamber can be provided as two streams of different composition that are aimed tangentially into the combustion chamber. U.S. Pat. No. 5,765,525 discloses an engine that produces radial stratification by directing one stream to swirl near the cylinder wall while the other stream is directed towards the center of the cylinder.

Envelope stratification can be produced by splitting the intake gases into two streams of different composition with the separation between them extending at right angles to the stem of the intake valve. U.S. Pat. No. 5,915,354 discloses an engine that produces envelope stratification using this method. The lower of the two streams is directed towards the center of the combustion chamber while the upper stream is directed towards the roof of the combustion chamber, the two streams then tumbling together at right angles to the cylinder axis.

Stratified exhaust gas recirculation (EGR) has been developed as yet another solution to the efficiency and emission problems associated with low/partial load operation. U.S. Pat. Nos. 4,393,853, 5,870,993, 5,894,826 and 5,918,577 all represent various forms of stratified exhaust gas recirculation (EGR).

In U.S. Pat. No. 4,393,853, there is disclosed an engine which implements stratified exhaust gas recirculation (EGR) methods. In the engine configuration described in this patent, a swirling fuel-air mixture is introduced through an intake valve into the center of the cylinder near the spark plug, and exhaust gas is directed from another cylinder or the exhaust gas manifold through a tangential port located in the middle of the cylinder wall. This engine configuration creates radial stratification wherein exhaust gas swirls adjacent the cylinder wall and the fuel-air mixture swirls in the center of the cylinder.

U.S. Pat. No. 5,870,993 discloses an engine configuration wherein exhaust gas is recirculated into the cylinder by opening the exhaust valve during the intake stroke thereby drawing a backflow of exhaust gas into the cylinder. A chamfer on the exhaust valve opening creates a swirling flow of recirculated exhaust gas that rotates about an axis parallel to the direction of motion of the reciprocating piston. A fuel-air mixture is also introduced into the cylinder in a manner that creates a tumble flow in the center region of the cylinder. The swirling exhaust gas flow and the tumbling fuel-air flow create stratification in the combustion chamber.

In U.S. Pat. No. 5,894,826, there is disclosed an engine with a first inlet port for introducing air tangentially into the cylinder to produce a generally circular motion in a peripheral region of the cylinder and a second inlet port to introduce air and recirculated exhaust gas, which is provided to the second inlet by way of an EGR passageway, toward the center of the cylinder.

U.S. Pat. No. 5,918,577 discloses another stratified EGR engine wherein exhaust gas is recirculated into the cylinder by opening the exhaust valve during the intake stroke thereby drawing a backflow of exhaust gas into the cylinder. A helical exhaust port creates a swirling flow of recirculated exhaust gas that rotates about an axis parallel to the direction of motion of the reciprocating piston. The exhaust gas remains substantially on the piston surface and along the cylinder wall to create a cup-shaped region. A fuel-air mixture is also introduced into the cylinder in a manner such that the fuel-air mixture swirls in the center of the cylinder. The swirling exhaust gas flow and fuel-air flow create a stratification in the combustion chamber.

While the engine configurations in U.S. Pat. Nos. 4,393,853, 5,870,993, 5,894,826 and 5,918,577 can provide improved engine efficiency and lower emissions, there are certain disadvantages with these prior stratified EGR systems. It is well known that the air-fuel ratio has a significant effect on engine torque and emissions. Particularly, one specific air-fuel ratio, the stoichiometric mixture, is highly significant and corresponds to an air and fuel combination such that if combustion were perfect all of the hydrogen and carbon in the fuel would be converted by the burning process to $H_2O$ and $CO_2$. Accordingly, it is preferred that an ignitable mixture be present in the center of the cylinder before the end of the compression stroke when ignition occurs so that emissions can be decreased. As a result, an ideal stratified EGR system should maintain a stratified flow during intake and compression such that an ignitable mixture is present in the center of the cylinder near the spark plug before ignition occurs. One disadvantage with the engine configurations disclosed in U.S. Pat. Nos. 4,393,853, 5,870,993, 5,894,826 and 5,918,577 is that these engine configurations may not maintain a stratified flow during intake and compression which can have negative effects on spark ignition combustion quality and emissions.

For example, the engine configuration in U.S. Pat. No. 4,393,853 provides some level of stratification, but significant mixing of the air-fuel mixture and recirculated exhaust gas is inevitable with this design. As a result, it may be difficult to achieve a near stoichiometric mixture in the center of the cylinder before ignition occurs. Likewise, the engine configuration in U.S. Pat. No. 5,870,993 provides stratification, but mixing of the air-fuel mixture and recirculated exhaust gas is inevitable because of the swirling flow of recirculated exhaust gas and the tumbling flow of the air-fuel mixture. With respect to the engine design in U.S. Pat. No. 5,894,826, significant mixing of air, fuel and exhaust gas will occur in this engine as the fuel is injected through exhaust gas and into air at the peripheral region of the cylinder. Lastly, while the engine configuration in U.S. Pat. No. 5,918,577 provides an improvement in the control of air-fuel mixture and exhaust gas mixing compared to the engines disclosed in U.S. Pat. Nos. 4,393,853, 5,870,993, and 5,894,826, the engine disclosed in U.S. Pat. No. 5,918,577 will also experience some mixing of the air-fuel mixture and recirculated exhaust gas as any recirculated exhaust gas existing on the top of the piston will be mixed with the air-fuel mixture when the piston pushes up on the recirculated exhaust gas and air-fuel mixture during the compression stroke.

Thus, there is a continuing need for a four-stroke reciprocating piston internal combustion engine that optimally implements stratified exhaust gas recirculation (EGR) methods to provide a solution to the efficiency and emission problems associated with low partial load engine operation. More particularly, there is a need for a four-stroke reciprocating piston internal combustion engine that uses stratified exhaust gas recirculation (EGR) methods and can maintain a stratified flow during intake and compression such that an ignitable and fully combustible mixture is present in the center of the cylinder before ignition occurs.

SUMMARY OF THE INVENTION

The foregoing disadvantages of prior art stratified exhaust gas recirculation (EGR) methods are overcome by providing a four-stroke reciprocating internal combustion engine with variable valve lift and timing for producing a stratified EGR/air-fuel mixture within the combustion chamber defined by the engine cylinder, the cylinder head and the piston. The stratified exhaust gas/air-fuel mixture produced by the engine comprises recirculated exhaust gas which rotates about the cylinder axis and remains substantially along an interior wall of the cylinder and an air-fuel mixture which rotates about the cylinder axis and occupies a portion of the piston surface and the remaining portion of the combustion chamber. The engine enables precise control of the motion of the radially stratified recirculated exhaust gas/air-fuel mixture during intake and compression such that no or minimal mixing occurs between the air-fuel mixture and the recirculated exhaust gas. As a result, recirculated exhaust gas surrounds a stoichiometric air-fuel mixture which resides in the center of the cylinder during ignition thereby achieving stable ignition and substantially complete combustion within the chamber. In addition, because of the stoichiometric operation of the engine, conventional three-way catalysts can be used for emission control.

One version of a four-stroke reciprocating internal combustion engine in accordance with the invention includes at least one combustion chamber that is defined by a cylinder, a reciprocating piston contained within the cylinder, and a cylinder head. Each combustion chamber is in fluid communication with at least one intake port and at least one exhaust port. At least one intake port includes an associated intake valve, an intake flow motion generating device and an associated intake flow direction control device for creating an intake fluid flow near the center of the cylinder. At least one exhaust port includes an exhaust valve that opens during the intake stroke at part load, an exhaust flow motion generating device and an associated exhaust flow direction control device for creating an exhaust fluid flow near the outer periphery of the combustion chamber during the intake stroke at part load. The flow motion generating devices may be helical ports, and the flow direction control devices may be valve masks or valve shrouds. The engine includes a variable valve lift and timing system for operating each exhaust valve and each intake valve, at least one sensor for sensing an engine operating condition, and an engine controller. The engine controller receives and processes signals from each sensor and outputs a control signal to the variable valve lift and timing system for operating each intake valve and each exhaust valve such that an exhaust residual flow is inducted through at least one exhaust port into each combustion chamber and an air-fuel mixture is simultaneously inducted through at least one intake port into each combustion chamber during the Intake stroke to produce the stratified exhaust gas and air-fuel mixture described above.

Another version of a four-stroke reciprocating internal combustion engine in accordance with the invention includes at least one combustion chamber that is defined by a cylinder, a reciprocating piston contained within the cylinder, and a cylinder head. Each combustion chamber is in fluid communication with at least one intake port and at least one exhaust port. At least one intake port includes an associated intake valve, an intake flow motion generating device and an associated intake flow direction control device for creating an intake air flow near the center of the cylinder. At least one exhaust port includes an exhaust valve that opens during the intake stroke at part load, an exhaust flow motion generating device and an associated exhaust flow direction control device for creating an exhaust fluid flow near the outer periphery of the combustion chamber during the intake stroke at part load. The flow motion generating devices may be helical ports, and the flow direction control devices may be valve masks or valve shrouds. The engine includes a fuel injector mounted in the cylinder head for directing fuel into the air in the combustion chamber, a variable valve lift and timing system for operating each exhaust valve and each intake valve, at least one sensor for sensing an engine operating condition, and an engine controller. The engine controller receives and processes signals from each sensor and outputs a control signal to the variable valve lift and timing system for operating each intake valve and each exhaust valve such that an exhaust residual flow is inducted through at least one exhaust port into each combustion chamber and air is simultaneously inducted through at least one intake port into each combustion chamber and fuel is directly injected into the air in the combustion chamber to produce the stratified exhaust gas and air-fuel mixture described above.

In one aspect of the invention, the stratified exhaust gas and air-fuel mixture comprises recirculated exhaust gas which rotates about the cylinder axis and remains substantially along an interior wall of the cylinder wall and an air-fuel mixture which rotates about the cylinder axis and occupies a portion of the piston surface and the remaining portion of the combustion chamber. Preferably, the exhaust gas rotates about the cylinder axis substantially parallel to a plane normal to the cylinder axis and the air-fuel mixture rotates about the cylinder axis substantially parallel to the plane. Most preferably, the exhaust gas and the air-fuel mixture rotate about the cylinder axis in the same direction and with substantially the same angular velocity thereby eliminating or significantly minimizing mixing between the recirculated exhaust gas and the air-fuel mixture.

It is therefore an object of the present invention to provide a four-stroke reciprocating piston internal combustion engine that optimally implements stratified exhaust gas recirculation (EGR) methods to provide a solution to the efficiency and emission problems associated with low/partial load engine operation.

It is another object of the present invention to provide a four-stroke reciprocating piston internal combustion engine that uses stratified exhaust gas recirculation (EGR) methods and can maintain a stratified flow during intake and compression such that a near stoichiometric mixture is present in the center of the cylinder near the spark plug before ignition occurs.

It is still another object of the present invention to provide a four-stroke reciprocating piston internal combustion engine that uses stratified exhaust gas recirculation (EGR) methods to maintain stable combustion with less fuel and reduced pumping losses thereby increasing fuel economy.

It is yet another object of the present invention to provide a four-stroke reciprocating piston internal combustion engine that uses stratified exhaust gas recirculation (EGR) methods to lower the temperature of combustion thereby reducing NOx emissions.

It is a further object of the present invention to provide a four-stroke reciprocating piston internal combustion engine that uses stratified exhaust gas recirculation (EGR) methods to reduce the effective size of the cylinder while maintaining reliable combustion at low and partial engine loads.

It is still another object of the present invention to provide a four-stroke reciprocating piston internal combustion engine that uses stratified exhaust gas recirculation (EGR) methods to create an outer layer of exhaust gas that acts as a thermal barrier between the combustion reaction and the cylinder wall thereby reducing thermal losses.

It is yet another object of the present invention to provide a four-stroke reciprocating piston internal combustion engine that uses stratified exhaust gas recirculation (EGR) methods to provide a solution to the efficiency and emission problems associated with low/partial load engine operation and that allows for the use of conventional three-way catalysts for exhaust emission control.

It is a further object of the present invention to provide a four-stroke reciprocating piston internal combustion engine that uses stratified exhaust gas recirculation (EGR) methods to isolate the crevice region above the piston ring from the air-fuel mixture.

One advantage of the present invention is that increased levels of EGR are tolerated. Another, more specific, advantage of the present invention is that pumping losses are reduced resulting in greater fuel economy. Yet another, more specific, advantage of the present invention is that NOx and hydrocarbon emissions of an engine are significantly reduced and that because of the stoichiometric operation of the engine, conventional three-way catalysts can be used for emission control. Still another advantage of the present invention is that heat transfer through the cylinder walls and piston is reduced, thereby increasing the thermodynamic efficiency of the engine. A further advantage of the present invention is that fuel economy is increased.

BRIEF DESCRIPTION OF THE DRAWINGS

These and other features, aspects, objects, and advantages of the present invention will become better understood upon consideration of the following detailed description, appended claims and accompanying drawings where:

Figure 1:
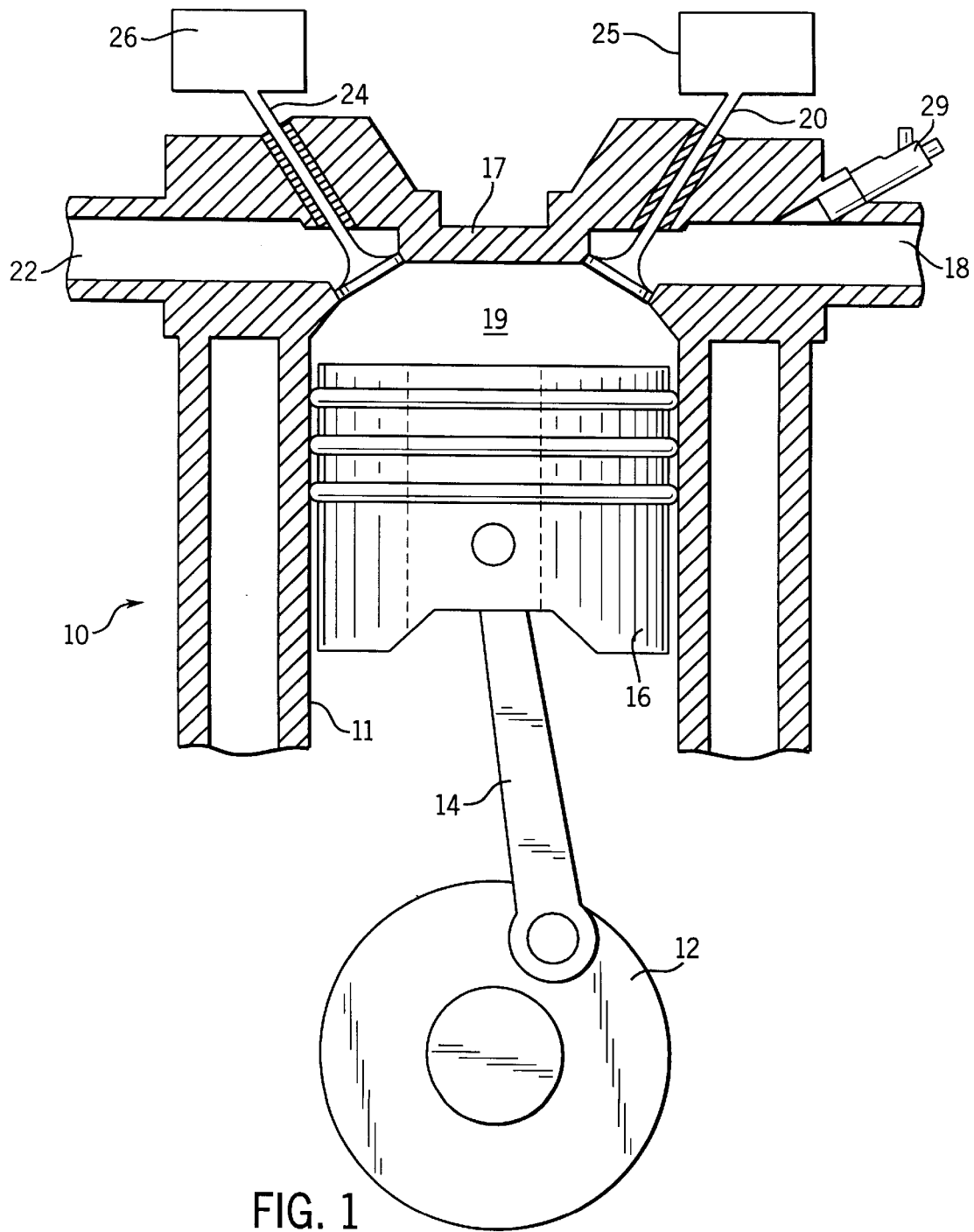
FIG. 1 is a schematic representation of a variable valve controlled engine according to the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DETAILED DESCRIPTION OF THE INVENTION

As shown in FIG. 1, one cylinder of a multi-cylinder four-stroke cycle reciprocating internal combustion engine 10 has a cylinder 11, a crankshaft 12 with a connecting rod 14 and a piston 16 disposed within the cylinder 11. A cylinder head 17 closes an end of the cylinder 11 and cooperates with the piston 16 to define a combustion chamber 19. The combustion chamber 19 communicates with an intake port 18 and an exhaust port 22 by an intake valve 20 and an exhaust valve 24, respectively. The intake valve 20 is operated by an intake valve actuator 25 and the exhaust valve 24 is operated by an exhaust valve actuator 26. A fuel injector 29 is arranged in fluid communication with the intake port 18 for injecting fuel into the intake port 18. While one intake valve, one exhaust valve, one intake port, and one exhaust port are shown in FIG. 1, it should be understood that the present invention can be used with an engine having multiple intake valves, exhaust valves, intake ports, and exhaust ports.

Figure 1A:
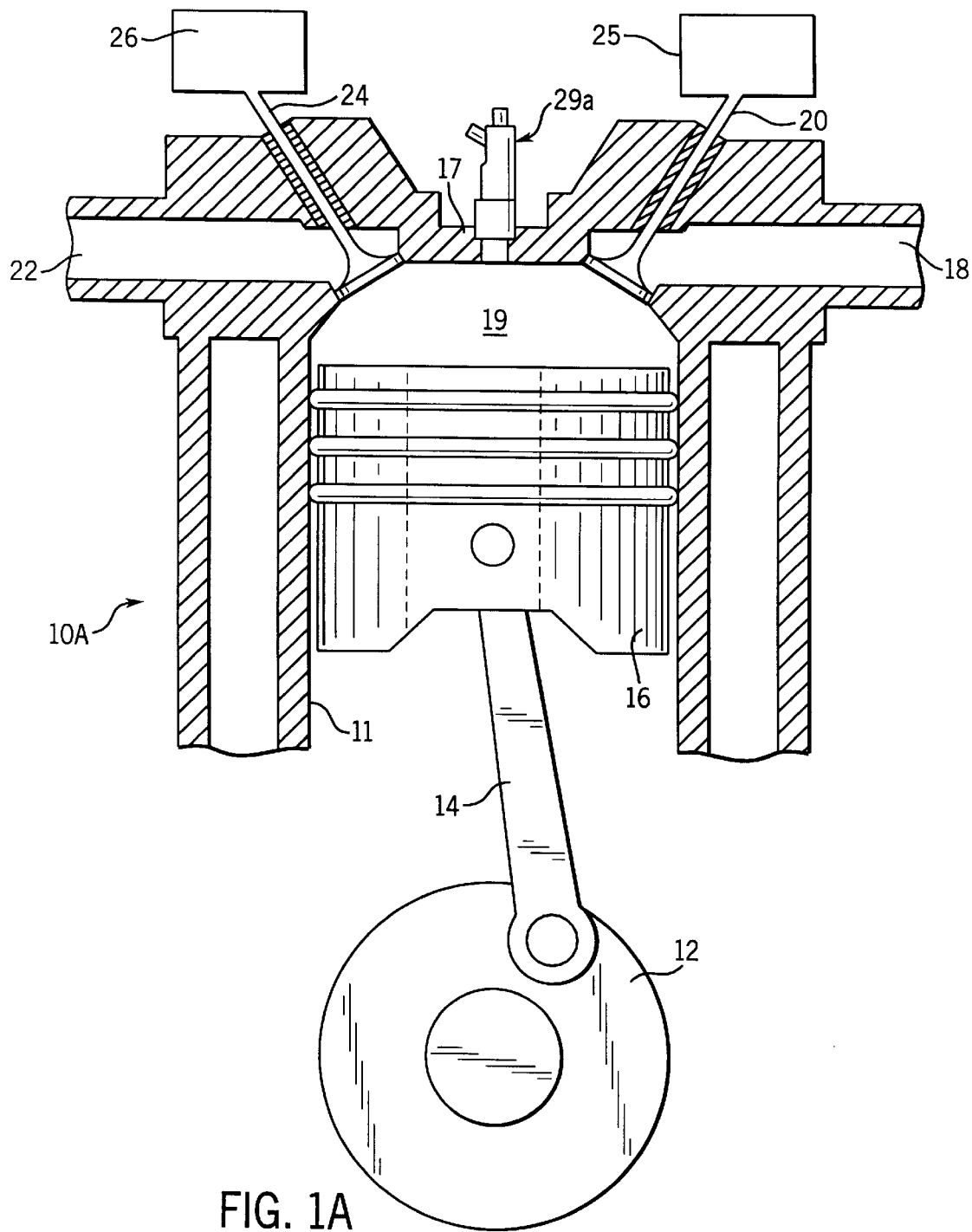
FIG. 1A is a schematic representation of another version of a variable valve controlled engine according to the present invention.

FIG. 1A shows another version of one cylinder of a multi-cylinder four-stroke cycle reciprocating internal combustion engine 10A. The engine 10A has a cylinder 11, a crankshaft 12 with a connecting rod 14, a piston 16, a cylinder head 17, an intake port 18, an exhaust port 22, an intake valve 20, an exhaust valve 24, an intake valve actuator 25, and an exhaust valve actuator 26 as in the engine 10 of FIG. 1. However, in the engine 10A of FIG. 1A, a fuel injector 29a is mounted in the cylinder head 17 for injecting fuel directly into the combustion chamber 19. While one intake valve, one exhaust valve, one intake port, and one exhaust port are shown in FIG. 1A, it should be understood that the present invention can be used with an engine having multiple intake valves, exhaust valves, intake ports, and exhaust ports.

Figure 2:
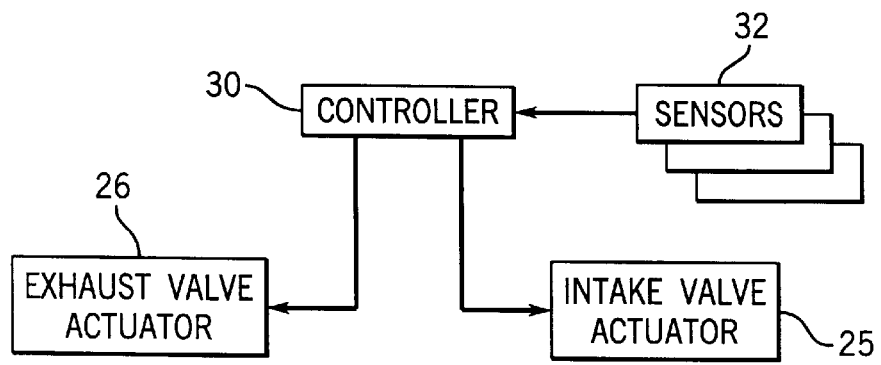
FIG. 2 is a block diagram of a control system according to the present invention.

FIG. 2 illustrates an engine control system according to the present invention. An engine controller 30 receives a variety of inputs from engine operating sensors 32, which include many of the types of sensors known to those skilled in the art of engine control and suggested by this disclosure. For instance, the engine operating sensors 32 may sense parameters such as engine speed, engine load, air-fuel ratio, intake manifold absolute pressure, engine intake air mass flow rate, engine exhaust temperature, exhaust manifold absolute pressure, engine temperature, vehicle speed, vehicle gear selection, accelerator position, and other parameters known to those skilled in the art and suggested by this disclosure. The engine controller 30, which may comprise an electronic engine operating controller drawn from many types known to those skilled in the art of automotive electronic engine controllers, compares sensed operating parameters with predetermined threshold values and outputs electrical signals that control various engine actuators. For example, in the present invention, the engine controller 30 is electrically connected to the intake valve actuator 25 and the exhaust valve actuator 26, and the engine controller 30 outputs electrical signals that are used by the intake valve actuator 25 and the exhaust valve actuator 26 to control motion of the intake valve 20 and exhaust valve 24, respectively.

The intake valve 20, the exhaust valve 24, the intake valve actuator 25 and the exhaust valve actuator 26 form part of a variable lift and timing valve system known in the art. For example, valvetrains controlled by a variable lift and timing electrohydraulic camless valve system are shown in U.S. Pat. Nos. 5,404,844 and 5,255,641; valvetrains controlled by a variable lift and timing electromagnetic camless valve system are shown in U.S. Pat. Nos. 5,743,221 and 5,692,463; and valvetrains controlled by a variable lift and timing mechanical valve system are shown in U.S. Pat. No. 5,592,906. Each of these patents is incorporated herein by reference. These types of valvetrains provide flexibility in which both the timing and lift of the intake valve 20 and the exhaust valve 24 can be varied. Accordingly, as used herein, the term "variable valve lift and timing system" will be used to describe a valvetrain in which both the timing and the lift of the intake valve 20 and the exhaust valve 24 can be varied. For instance, in the preferred version of the present invention, the intake valve actuator 25 and the exhaust valve actuator 26 receive signals from the engine controller 30 and enable variable timing and lift of the intake valve 20 and the exhaust valve 24.

The intake valve actuator 25 and the intake valve 20 are used to induct an air-fuel mixture from the intake port 18 during the intake stroke of the engine 10 shown in FIG. 1. The engine controller 30 compares sensed operating parameters with load demand and predetermined threshold values and sends an electrical signal to the intake valve actuator 25. The intake valve actuator 25 then operates the intake valve 20 so that the air-fuel mixture may flow from the intake port 18 into predetermined regions of combustion chamber 19 during the intake stroke.

The intake valve actuator 25 and the intake valve 20 are used to induct air from the intake port 18 during the intake stroke of the engine 10A shown in FIG. 1A. The engine controller 30 compares sensed operating parameters with load demand and predetermined threshold values and sends an electrical signal to the intake valve actuator 25. The intake valve actuator 25 then operates the intake valve 20 so that air may flow from the intake port 18 into predetermined regions of combustion chamber 19 during the intake stroke.

The exhaust valve actuator 26 and the exhaust valve 24 are used to induct exhaust gas from the exhaust port 22 during the intake stroke of the engine 10 or 10A. The engine controller 30 compares sensed operating parameters with load demand and predetermined threshold values and sends an electrical signal to the exhaust valve actuator 26. The exhaust valve actuator 26 then operates the exhaust valve 24 so that exhaust gas residual may flow from the exhaust port 22 into predetermined regions of combustion chamber 19 during the intake stroke. As used herein, the flow of exhaust gases into the combustion chamber will be termed "exhaust residuals".

One particular advantage of using a variable valve lift and timing system wherein the intake valve actuator 25 and the exhaust valve actuator 26 receive signals from the engine controller 30 and enable continuously variable timing and lift of the intake valve 20 and the exhaust valve 24 is that the amount of intake air or air-fuel mixture inducted into the combustion chamber 19 through the intake port 18 may be varied in response to load demand and a sensed engine load or a derived engine load value and the amount of exhaust inducted into the combustion chamber 19 through the exhaust port 22 may be varied in order to fill the combustion chamber and thereby reduce pumping losses.

Figure 3:
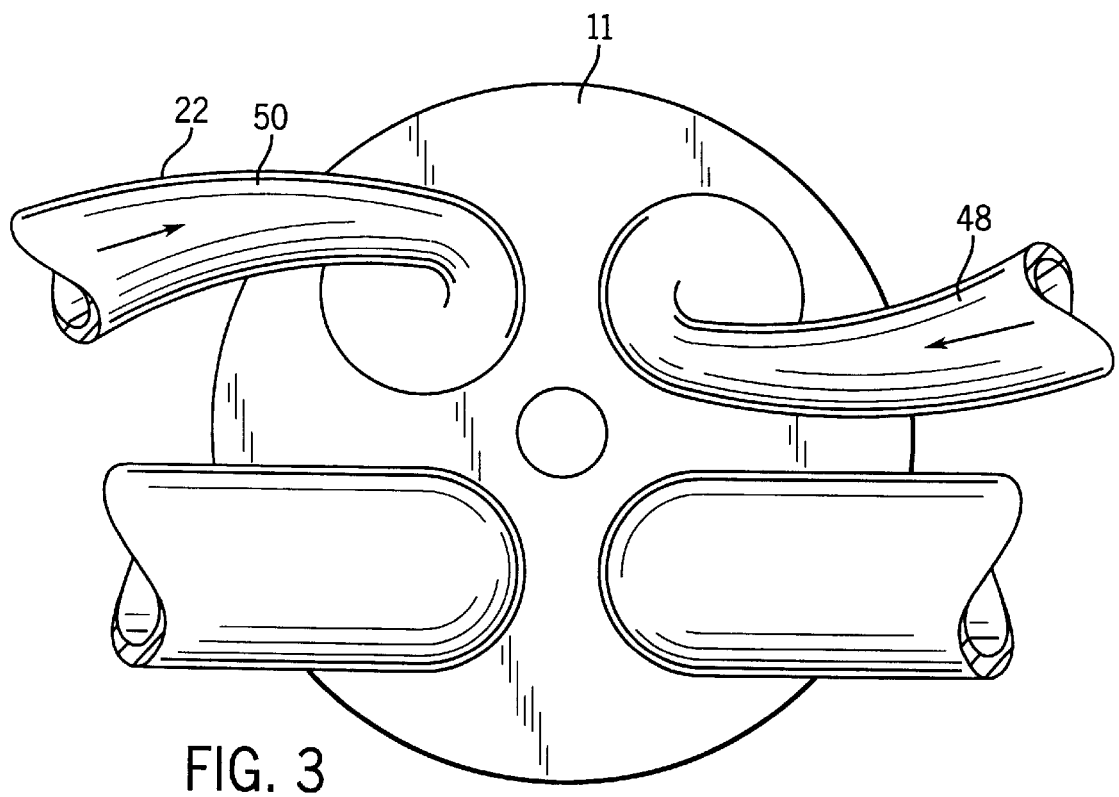
FIG. 3 is a schematic representation of an engine including helical intake and exhaust ports for creating swirling intake flow and exhaust gas flow that are introduced into the combustion chamber of an engine according to the present invention.

According to the present invention, the intake port 18 and the exhaust port 22 contain a flow motion generating device that works in conjunction with the variable valve lift and timing system to generate a particular motion in the air or air-fuel mixture and exhaust gas inducted into the combustion chamber 19. Referring to FIG. 3, there is shown a helical intake port 48 and a helical exhaust port 50 that may be used in conjunction with the variable valve lift and timing system as a means to generate a swirling motion in the intake air or air-fuel mixture and the exhaust residual inducted into specific regions of combustion chamber 19. Alternatively, an irregular surface in the flow cross-section of the intake port 18 and the exhaust port 22 may be used to generate a swirling motion in the air or air-fuel mixture and exhaust residuals inducted into the combustion chamber 19.

Figure 4:
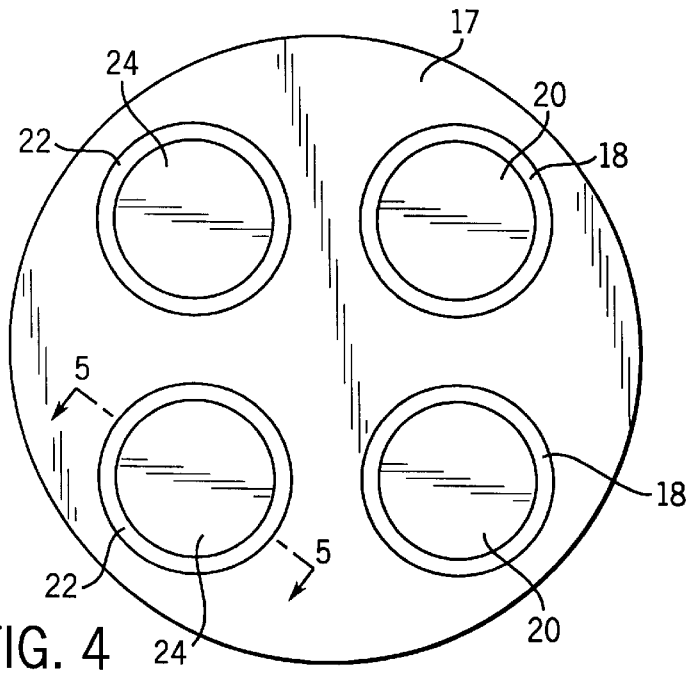
FIG. 4 is a bottom plan view of a cylinder head having means for directing intake and exhaust flow into the combustion chamber of an engine according to the present invention.
Figure 5:
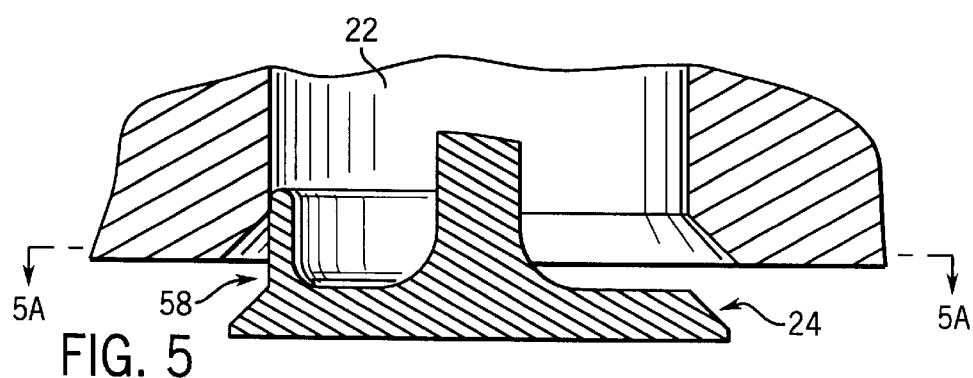
FIG. 5 is a sectional view of the cylinder head of FIG. 4 taken along line 5—5.
Figure 5A:
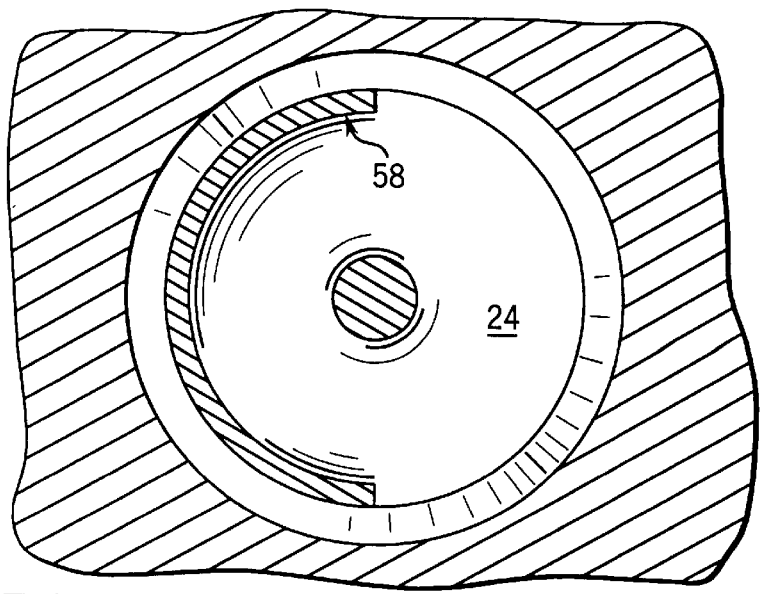
FIG. 5A is a sectional view of the cylinder head of FIG. 5 taken along line 5A—5A.
Figure 6:
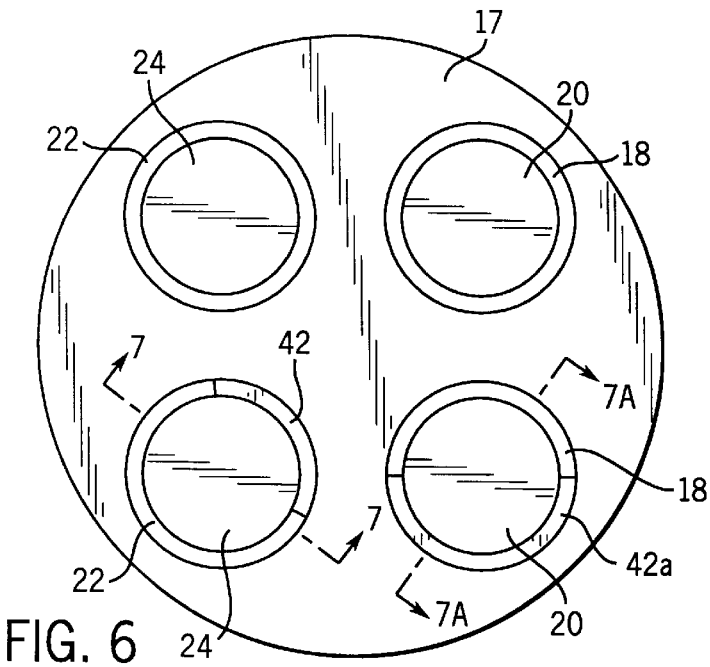
FIG. 6 is a bottom plan view of an alternative cylinder head having means for directing intake and exhaust flow into the combustion chamber of an engine according to the present invention.
Figure 7:
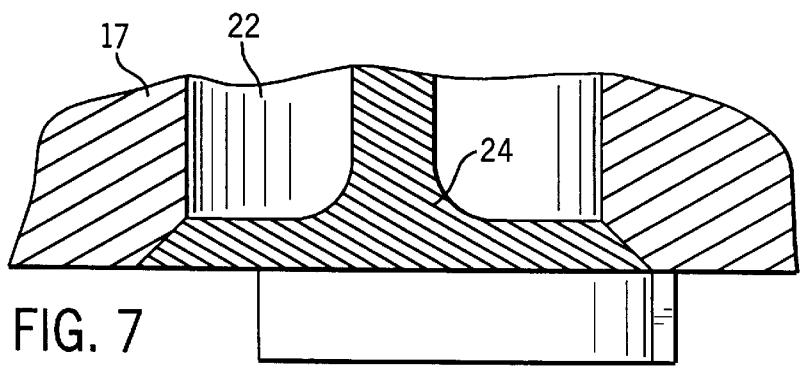
FIG. 7 is a sectional view of the cylinder head of FIG. 6 taken along line 7—7.
Figure 7A:
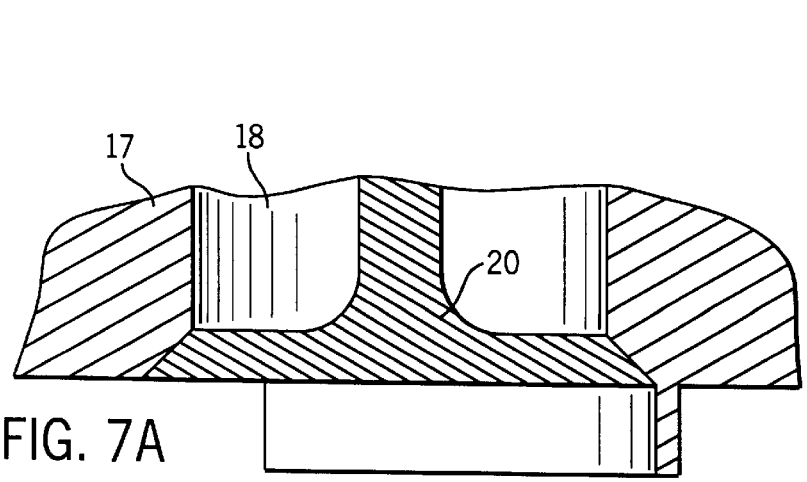
FIG. 7A is a sectional view of the cylinder head of FIG. 6 taken along line 7A—7A.

According to the present invention, the intake port 18 and the exhaust port 22 each contain an associated flow direction control device. The flow direction control devices work in conjunction with the variable valve lift and timing system to direct air or air-fuel mixture and exhaust residuals into specific regions of the combustion chamber 19. FIGS. 4, 5 and 5A show one version of a flow direction control device. Looking at FIGS. 4, 5 and 5A, there is shown a valve shroud 58 on a portion of the exhaust valve 24 that serves to direct exhaust residuals into specific regions of the combustion chamber 19 when the exhaust valve 24 is opened. Of course, the same type of valve shroud can be used on the intake valve 20 to direct intake air or air-fuel mixture into specific regions of the combustion chamber 19 when the intake valve 20 is opened. FIGS. 6, 7 and 7A show another version of a flow direction control device. Referring now to FIGS. 6, 7 and 7A, there is shown a valve mask 42 on one side of the flow cross section of the exhaust port 22 and a valve mask 42a on one side of the flow cross section of the intake port 18. The valve masks 42 and 42a direct air or air-fuel mixture and exhaust residuals into specific regions of the combustion chamber 19 when the intake valve 20 and the exhaust valve 24 are opened. While four valves/cylinder are shown in FIGS. 3–7A, it will be appreciated by those skilled in the art that any number of valves/cylinder may be used, provided that the port structure or valve structure is used to obtain the desired air and exhaust gas motion or direction within combustion chamber 19.

During operation of the engine 10 in accordance with the present invention, fuel is injected into air in the intake port 18 from fuel injector 29 either while the intake valve 20 is closed or open to produce an air-fuel mixture. The engine controller 30 receives and processes sensed parameters, and the engine controller 30 commands the intake valve actuator 25 to operate the intake valve 20 to induce varied levels of the air-fuel mixture into the combustion chamber 19 during the intake stroke to achieve the required load. For instance, the engine controller 30 typically receives load demand signals and receives or derives engine load signals and then commands the intake valve actuator 25 to operate the intake valve 20 to induce a specific level of air-fuel mixture into the combustion chamber that depends on the load demand and the measured engine load. Also during the intake stroke, the engine controller 30 commands the exhaust valve actuator 26 to operate the exhaust valve 24 to induce varied levels of exhaust gas residuals from the exhaust port 22 into the combustion chamber 19. The exhaust gas residuals serve to fill the combustion chamber 19 and reduce pumping losses. The ratio of exhaust gas mass to air mass varies between 0 and 1 depending on the operating conditions. The exhaust residual is directed into the outermost regions of combustion chamber 19 by way of the helical exhaust port 50 and the valve shroud 58 or the valve mask 42. At the same time, the air-fuel mixture inducted through the intake port 18 is directed into the inner regions of combustion chamber 19 by way of the helical intake port 48 and a valve shroud or the valve mask 42a to produce a radially stratified exhaust and air-fuel mixture within combustion chamber 19.

During operation of the engine 10A in accordance with the present invention, the engine controller 30 receives and processes sensed parameters, and the engine controller 30 commands the intake valve actuator 25 to operate the intake valve 20 to induce varied levels of air into the combustion chamber 19 during the intake stroke to achieve the required load. For instance, the engine controller 30 typically receives load demand signals and receives or derives engine load signals and then commands the intake valve actuator 25 to operate the intake valve 20 to induce a specific level of air into the combustion chamber that depends on the load demand and the measured engine load. Also during the intake stroke, the engine controller 30 commands the exhaust valve actuator 26 to operate the exhaust valve 24 to induce varied levels of exhaust gas residuals from the exhaust port 22 into the combustion chamber 19. The exhaust gas residuals serve to fill the combustion chamber 19 and reduce pumping losses. The ratio of exhaust gas mass to air mass varies between 0 and 1 depending on the operating conditions. The exhaust residual is directed into the outermost regions of combustion chamber 19 by way of the helical exhaust port 50 and the valve shroud 58 or the valve mask 42. At the same time, air inducted through the intake port 18 is directed into the inner regions of combustion chamber 19 by way of the helical intake port 48 and a valve shroud or the valve mask 42a. Fuel is directly injected into the air in the combustion chamber 19 from fuel injector 29a during the intake stroke to produce a radially stratified exhaust and air-fuel mixture within combustion chamber 19. When using a centrally located direct fuel injector 29a, the cone angle and the penetration are optimized to prevent fuel from entering the exhaust residual in the outermost regions of combustion chamber 19 and to prevent wefting of the piston 16 and/or cylinder head 17.

Figure 8:
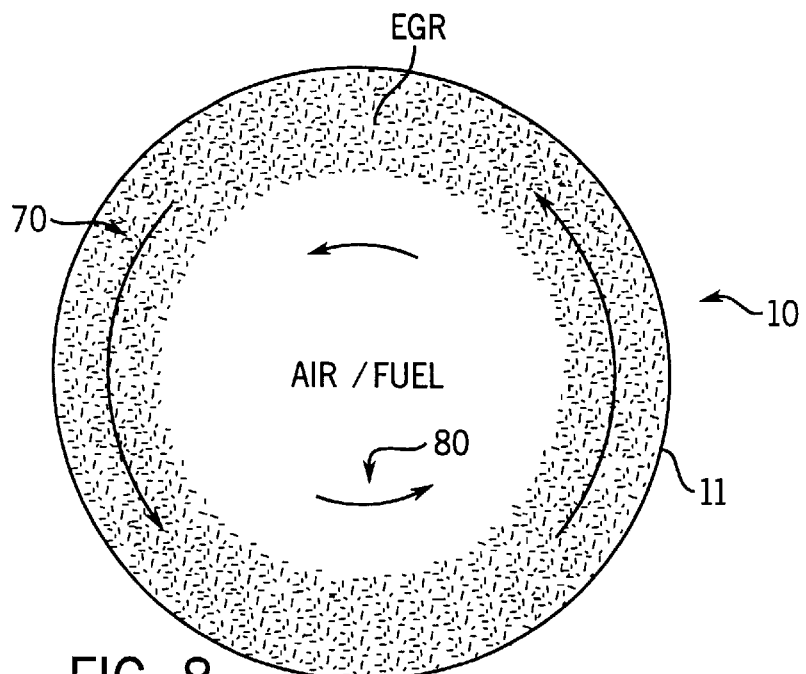
FIG. 8 is a schematic illustration of a top plan view of the charge within the combustion chamber of the engine according to the present invention.
Figure 9:
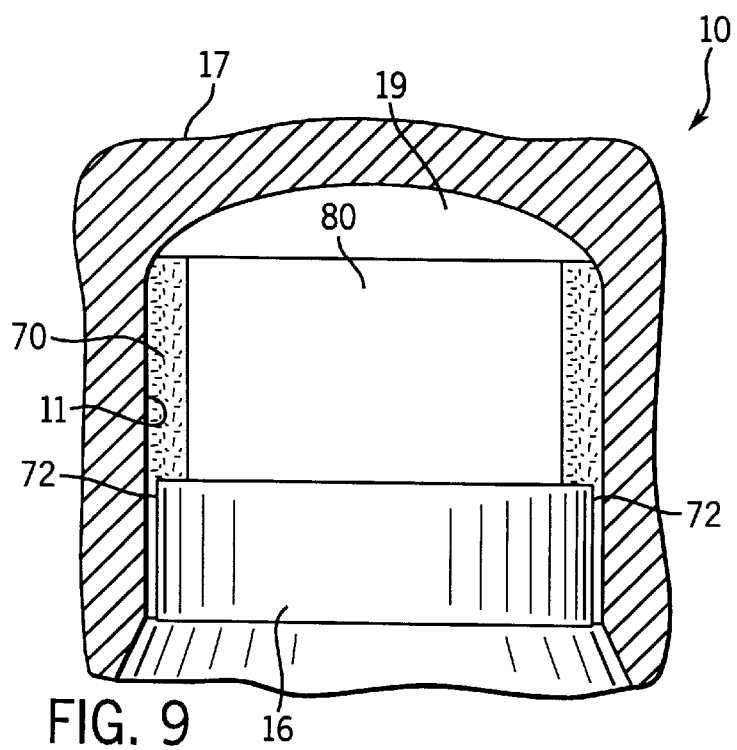
FIG. 9 is a schematic illustration of a side sectional view of the charge within the combustion chamber of the engine according to the present invention.

Referring now to FIGS. 8 and 9, a radially stratified mixture is shown, where the exhaust residual 70 rotates about the axis of the cylinder and resides along the entire wall of the entire cylinder to form a substantially tubular exhaust region, while the air-fuel mixture 80 rotates about the axis of the cylinder and resides substantially in the center of combustion chamber 19. The exact amount of air or air-fuel mixture and exhaust residual to be induced into the combustion chamber 19 is dependent upon a variety of engine operation conditions. As shown in FIG. 9, the exhaust residual 70 also covers the crevice region 72 above the piston ring(s) such that the air-fuel mixture cannot enter the crevice region 72. This serves to reduce hydrocarbon emissions from the engine.

Improved engine efficiency and reduced emissions can be achieved by an engine 10 in accordance with the present invention (as shown in FIG. 1) because the stratified mixture shown in FIGS. 8 and 9 can be maintained during the intake and the compression stroke. During operation of the engine 10 of FIG. 1, exhaust gas may be inducted during the intake stroke into the combustion chamber 19 through the exhaust port 22 and the exhaust residual rotates about the axis of the cylinder and resides along the entire wall of the entire cylinder to form a substantially tubular exhaust region, while the air-fuel mixture is inducted through the intake port 18 and rotates about the axis of the cylinder and resides substantially in the center of combustion chamber 19. It has been discovered that by inducting the exhaust gas and the air-fuel mixture into the combustion chamber 19 during the intake stroke such that there is minimal mixing between the exhaust residual and the air-fuel mixture, spark ignition combustion quality and reliability can be improved. Preferably, there is no mixing between the exhaust residual and the air-fuel mixture, and the result of the intake stroke and the compression stroke is a swiding homogeneous stoichiometric air-fuel mixture (near 0% exhaust) in the center of the cylinder surrounded by a swirling ring of incombustible exhaust gas (near 0% air-fuel mixture) before the end of the compression stroke.

Improved engine efficiency and reduced emissions can also be achieved by an engine 10A in accordance with the present invention (as shown in FIG. 1A) as the stratified mixture shown in FIGS. 8 and 9 can be maintained during the intake and the compression stroke. During operation of the engine 10A of FIG. 1A, exhaust gas may be inducted during the intake stroke into the combustion chamber 19 through the exhaust port 22 and the exhaust residual rotates about the axis of the cylinder and resides along the entire wall of the entire cylinder to form a substantially tubular exhaust region, while air is inducted through the intake port 18 and rotates about the axis of the cylinder and resides substantially in the center of combustion chamber 19. Fuel is directly injected into the air in the combustion chamber by way of fuel injector 29a. It has been discovered that by inducting the exhaust gas and the air during the intake stroke into the combustion chamber 19 such that there is minimal mixing between the exhaust residual and the air-fuel mixture created when fuel is injected into the air, spark ignition combustion quality and reliability can be improved. Preferably, there is no mixing between the exhaust residual and the air-fuel mixture, and the result of the intake stroke and the compression stroke is a swirling homogeneous stoichiometric air-fuel mixture (near 0% exhaust) in the center of the cylinder surrounded by a swirling ring of incombustible exhaust gas (near 0% air-fuel mixture) before the end of the compression stroke.

An engine 10 or an engine 10A in accordance with the present invention is particularly useful in eliminating or minimizing mixing between the swirling exhaust gas and air-fuel mixture as the engine 10 and the engine 10A can create and maintain a radially stratified exhaust gas/air-fuel mixture wherein the exhaust gas and the air-fuel mixture rotate about the cylinder axis in the same direction and with substantially the same angular velocity. When the exhaust gas and the air-fuel mixture rotate in the same direction and with substantially the same angular velocity, there is minimal relative movement at the exhaust gas/air-fuel interface and therefore, there is minimal mixing between the exhaust gas and the air-fuel mixture. By creating and maintaining a radially stratified exhaust gas/air-fuel mixture wherein the exhaust gas and the air-fuel mixture rotate about the cylinder axis in the same direction and with substantially the same angular velocity, the engine design assures that at the moment of spark ignition, a homogeneous stoichiometric air-fuel mixture exists in the center of the cylinder near the spark plug and a ring of incombustible exhaust gas surrounds the homogeneous stoichiometric air-fuel mixture.

By incorporating an engine load sensor or other sensors from which an engine load value can be derived, an intake air mass flow rate sensor, an engine exhaust temperature sensor, an exhaust manifold absolute pressure sensor, a controller responsive to these sensors, and a variable lift and timing valve system into the engine 10 or the engine 10A, it is possible to precisely control the engine load and corresponding EGR rate and create and maintain a radially stratified exhaust gas/air-fuel mixture wherein the exhaust gas and the air-fuel mixture rotate about the cylinder axis in the same direction and with substantially the same angular velocity thereby minimizing mixing between the exhaust gas and the air-fuel mixture. The engine load sensor or other sensors from which an engine load value can be derived provide a signal that is used to control the fuel injector and the exact amount of air and exhaust gas residual entering the combustion chamber. The intake air mass flow rate sensor, the engine exhaust temperature sensor, and the exhaust manifold absolute pressure sensor also provide signals that are used the control the amount of air and exhaust gas residual entering the combustion chamber 19. It has been discovered that it is preferable to open the intake valve 20 and the exhaust valve 24 at the same time and for the same duration in order to create a radially stratified exhaust gas/air-fuel mixture with minimal mixing between the exhaust gas and the air-fuel mixture wherein the exhaust gas and the air-fuel mixture rotate about the cylinder axis in the same direction and with substantially the same angular velocity.

Therefore, by: (1) providing the intake port 18 and the exhaust port 22 with a flow motion generating device and an associated flow direction control device; (2) measuring or deriving engine load, intake air mass flow rate, engine exhaust temperature, and engine exhaust manifold absolute pressure, (3) using the variable timing feature of the variable lift and timing valve system to open and close the intake valve 20 and the exhaust valve 24 at substantially the same time, and (4) using the variable lift feature of the variable lift and timing valve system to allow variable amounts of air or air-fuel and exhaust gas to flow through the intake port 18 and the exhaust port 22 respectively into the combustion chamber 19 when the intake valve 20 and the exhaust valve 24 are open, it is possible to create a radially stratified exhaust gas/air-fuel mixture wherein the exhaust gas and the air-fuel mixture rotate about the cylinder axis in the same direction and with substantially the same angular velocity.

An engine in accordance with the present invention has many advantages. For example, (1) the recirculated exhaust gas effectively reduces the volume of the combustion chamber and thereby reduces the amount of fuel/air required as no extra power is required to offset pumping losses; (2) the smaller mass of air/fuel mixture in the cylinder during part load operation and the surrounding uncombusted exhaust gas lower the peak temperature of combustion thereby reducing NOx emissions; (3) engine efficiency is improved because the exhaust residual resides substantially along the walls of the cylinder thereby decreasing heat transfer from the combustion chamber; (4) in one version of the invention, stable combustion can be achieved with mixtures of very high overall dilution by arranging for the air-fuel mixture drawn in through the intake port 18 to be stoichiometric while drawing in exhaust gas residual from the exhaust port 22; (5) in another version of the invention, stable combustion can be achieved with mixtures of very high overall dilution by drawing in air through the intake port 18 and directly injecting fuel into the air in the cylinder such that a stoichiometric airfuel mixture is formed while drawing in exhaust gas residual from the exhaust port 22; (6) by maintaining precise control of the motion of the radially stratified exhaust gas residual/air-fuel mixture during intake and compression, a stoichiometric air-fuel mixture resides near the spark plug during ignition thereby achieving near complete combustion; (7) by filling the combustion chamber with an air/fuel mixture and surrounding uncombusted exhaust gas pumping losses are minimized; and (8) because of the stoichiometric operation of the engine, conventional three-way catalysts can be used for emission control.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the scope of the appended claims should not be limited to the description of the preferred embodiments contained herein.

What is claimed is:

1. A four-stroke reciprocating internal combustion engine comprising:

at least one combustion chamber, each combustion chamber being defined by a cylinder, a reciprocating piston contained within the cylinder, and a cylinder head;

at least one exhaust port in fluid communication with each combustion chamber, the at least one exhaust port including an exhaust valve, an exhaust flow motion generating device and an associated exhaust flow direction control device for creating an exhaust fluid flow near the outer periphery of the combustion chamber such that the exhaust fluid flow rotates about a cylinder axis extending in the direction of reciprocation of the piston within the combustion chamber;

at least one intake port in fluid communication with each combustion chamber, the at least one intake port being in fluid communication with a fuel injector for directing fuel into air in the at least one intake port, the at least one intake port including an intake valve, an intake flow motion generating device and an associated intake flow direction control device for creating an intake fluid flow near the center of the cylinder such that the intake fluid flow rotates about the cylinder axis;

a variable valve lift and timing system for operating the exhaust valve and the intake valve;

at least one sensor for sensing at least one engine operating condition; and a controller, responsive to each sensor and electrically connected to the variable valve lift and timing system, the controller providing a control signal to the variable valve lift and timing system for operating the intake valve and the exhaust valve such that an exhaust residual flow is inducted through the at least one exhaust port into each combustion chamber and an air-fuel mixture is simultaneously inducted through the at least one intake port into each combustion chamber to produce a stratified exhaust gas and air-fuel mixture wherein the exhaust gas rotates about the cylinder axis and remains substantially along an interior wall of the cylinder and the air-fuel mixture rotates about the cylinder axis and occupies a portion of the piston surface and the remaining portion of the combustion chamber.

2. The engine of claim 1 wherein:

the exhaust gas and the air-fuel mixture rotate about the cylinder axis in the same direction and with substantially the same angular velocity.

3. The engine of claim 1 wherein:

the exhaust gas rotates about the cylinder axis substantially parallel to a plane normal to the cylinder axis and the air-fuel mixture rotates about the cylinder axis substantially parallel to the plane.

4. The engine of claim 1 wherein:

the exhaust flow motion generating device comprises a helically shaped exhaust port.

5. The engine of claim 1 wherein:

the intake flow motion generating device comprises a helically shaped intake port.

6. The engine of claim 1 wherein:

the exhaust flow direction control device comprises a shroud on the exhaust valve.

7. The engine of claim 1 wherein:

the intake flow direction control device comprises a shroud on the intake valve.

8. The engine of claim 1 wherein:

the exhaust flow direction control device comprises a mask adjacent an exhaust valve seat in the at least one exhaust port.

9. The engine of claim 1 wherein:

the intake flow direction control device comprises a mask adjacent an intake valve seat in the at least one intake port.

10. The engine of claim 1 wherein:

the exhaust gas occupies a region defined by a tubular region.

11. The engine of claim 1 wherein the variable valve lift and timing system comprises:

an intake valve actuator for operating the intake valve so as to control the timing of the intake valve opening and closing and the lift of the intake valve opening; and an exhaust valve actuator for operating the exhaust valve so as to control the timing of the exhaust valve opening and closing and the lift of the exhaust valve opening.

12. The engine of claim 11 wherein:

the controller provides an intake valve control signal to the intake valve actuator and the controller provides an exhaust valve control signal to the exhaust valve actuator such that the timing of the intake valve opening and closing and the timing of the exhaust valve opening and closing are substantially equal.

13. The engine of claim 11 further comprising:

at least one engine sensor which outputs at least one signal related to engine load;

an intake air mass flow rate sensor for outputting an intake air mass flow rate signal;

an exhaust gas temperature sensor for outputting an exhaust gas temperature signal; and an exhaust manifold absolute pressure sensor for outputting an exhaust manifold absolute pressure signal, wherein the controller processes each signal related to engine load to derive an engine load signal, the intake air mass flow rate signal, the exhaust gas temperature signal, and the exhaust manifold absolute pressure signal, and the controller provides an intake valve control signal to the intake valve actuator and the controller provides an exhaust valve control signal to the exhaust valve actuator such that the timing of the intake valve opening and closing and the lift of the intake valve are dependent on the engine load signal and the intake air mass flow rate signal and the timing of the exhaust valve opening and closing and the lift of the exhaust valve are dependent on the engine load signal, the exhaust gas temperature signal and the exhaust manifold absolute pressure signal.

14. The engine of claim 13 wherein:

the timing of the intake valve opening and closing and the timing of the exhaust valve opening and closing in each cylinder are substantially equal.

15. A four-stroke reciprocating internal combustion engine comprising:

at least one combustion chamber, each combustion chamber being defined by a cylinder, a reciprocating piston contained within the cylinder, and a cylinder head;

at least one exhaust port in fluid communication with each combustion chamber, the at least one exhaust port including an exhaust valve, an exhaust flow motion generating device and an associated exhaust flow direction control device for creating an exhaust fluid flow near the outer periphery of the combustion chamber such that the exhaust fluid flow rotates about a cylinder axis extending in the direction of reciprocation of the piston within the combustion chamber;

at least one intake port in fluid communication with each combustion chamber, the at least one intake port including an intake valve, an intake flow motion generating device and an associated intake flow direction control device for creating an intake air flow near the center of the cylinder such that the intake air flow rotates about the cylinder axis;

a variable valve lift and timing system for operating the exhaust valve and the intake valve;

a fuel injector mounted in the cylinder head of each combustion chamber, the fuel injector directing fuel into the intake air flow near the center of the cylinder for at least a portion of the intake stroke;

at least one sensor for sensing at least one engine operating condition; and a controller, responsive to each sensor and electrically connected to the variable valve lift and timing system, the controller providing a control signal to the variable valve lift and timing system for operating the intake valve and the exhaust valve such that an exhaust residual flow is inducted through the at least one exhaust port into each combustion chamber and intake air is simultaneously inducted through the at least one intake port into each combustion chamber while the fuel injector injects fuel into the intake air flow to produce a stratified exhaust gas and air-fuel mixture wherein the exhaust gas rotates about the cylinder axis and remains substantially along an interior wall of the cylinder and the air-fuel mixture rotates about the cylinder axis and occupies a portion of the piston surface and the remaining portion of the combustion chamber.

16. The engine of claim 15 wherein:

the exhaust gas and the air-fuel mixture rotate about the cylinder axis in the same direction and with substantially the same angular velocity.

17. The engine of claim 15 wherein:

the exhaust gas rotates about the cylinder axis substantially parallel to a plane normal to the cylinder axis and the air-fuel mixture rotates about the cylinder axis substantially parallel to the plane.

18. The engine of claim 15 wherein:

the exhaust flow motion generating device comprises a helically shaped exhaust port.

19. The engine of claim 15 wherein:

the intake flow motion generating device comprises a helically shaped intake port.

20. The engine of claim 15 wherein:

the exhaust flow direction control device comprises a shroud on the exhaust valve.

21. The engine of claim 15 wherein:

the intake flow direction control device comprises a shroud on the intake valve.

22. The engine of claim 15 wherein:

the exhaust flow direction control device comprises a mask adjacent an exhaust valve seat in the at least one exhaust port.

23. The engine of claim 15 wherein:

the intake flow direction control device comprises a mask adjacent an intake valve seat in the at least one intake port.

24. The engine of claim 15 wherein:

the exhaust gas occupies a region defined by a tubular region.

25. The engine of claim 15 wherein the variable valve lift and timing system comprises:

an intake valve actuator for operating the intake valve so as to control the timing of the intake valve opening and closing and the lift of the intake valve opening; and an exhaust valve actuator for operating the exhaust valve so as to control the timing of the exhaust valve opening and closing and the lift of the exhaust valve opening.

26. The engine of claim 25 wherein:

the controller provides an intake valve control signal to the intake valve actuator and the controller provides an exhaust valve control signal to the exhaust valve actuator such that the timing of the intake valve opening and closing and the timing of the exhaust valve opening and closing are substantially equal.

27. The engine of claim 25 further comprising:

at least one engine sensor which outputs at least one signal related to engine load;

an intake air mass flow rate sensor for outputting an intake air mass flow rate signal;

an exhaust gas temperature sensor for outputting an exhaust gas temperature signal; and an exhaust manifold absolute pressure sensor for outputting an exhaust manifold absolute pressure signal, wherein the controller processes each signal related to engine load to derive an engine load signal, the intake air mass flow rate signal, the exhaust gas temperature signal, and the exhaust manifold absolute pressure signal, and the controller provides an intake valve control signal to the intake valve actuator and the controller provides an exhaust valve control signal to the exhaust valve actuator such that the timing of the intake valve opening and closing and the lift of the intake valve are dependent on the engine load signal and the intake air mass flow rate signal and the timing of the exhaust valve opening and closing and the lift of the exhaust valve are dependent on the engine load signal, the exhaust gas temperature signal and the exhaust manifold absolute pressure signal.

28. The engine of claim 27 wherein:
the timing of the intake valve opening and closing and the timing of the exhaust valve opening and closing in each cylinder are substantially equal.

29. A method of inducting exhaust residual gas and an air-fuel mixture to produce a stratified exhaust gas and air-fuel mixture in a combustion chamber of an engine having a variable valve lift and timing system, the combustion chamber being defined by a cylinder, a cylinder head, and a piston moveable within the cylinder, and the engine having an intake port and an exhaust port each in fluid communication with the combustion chamber, the method comprising the steps of:
injecting fuel into air in the intake port to produce an air-fuel mixture;
inducting the air-fuel mixture through the intake port into the combustion chamber towards a cylinder axis extending in the direction of movement of the piston within the combustion chamber; and
inducting an exhaust residual through the exhaust port near the outer periphery of the combustion chamber to produce a stratified exhaust gas and air-fuel mixture wherein the exhaust gas rotates about the cylinder axis and remains substantially along an interior wall of the cylinder and the air-fuel mixture rotates about the cylinder axis and occupies a portion of the piston surface and the remaining portion of the combustion chamber.

30. The method of claim 29 wherein:
the step of inducting the air-fuel mixture through the intake port into the combustion chamber and the step of inducting an exhaust residual through the exhaust port occur substantially simultaneously.

31. The method of claim 29 wherein:
the step of inducting the air-fuel mixture through the intake port into the combustion chamber comprises inducting the air-fuel mixture through the intake port and directing the air-fuel mixture into the combustion chamber towards a cylinder axis extending in the direction of movement of the piston within the combustion chamber, and
the step of inducting an exhaust residual through the exhaust port comprises inducting an exhaust residual through the exhaust port and directing the exhaust gas residual tangentially near the outer periphery of the combustion chamber to produce a stratified exhaust and air-fuel mixture wherein the exhaust gas rotates at an angular velocity about the cylinder axis and remains substantially along an interior wall of the cylinder and the air-fuel mixture rotates at the angular velocity about the cylinder axis and occupies a portion of the piston surface and the remaining portion of the combustion chamber.

32. The method of claim 29 wherein:
the step of inducting the air-fuel mixture through the intake port into the combustion chamber comprises inducting the air-fuel mixture through the intake port and directing the air-fuel mixture into the combustion chamber towards a cylinder axis extending in the direction of movement of the piston within the combustion chamber, and the step of inducting an exhaust residual through the exhaust port comprises inducting an exhaust residual through the exhaust port and directing the exhaust gas residual tangentially near the outer periphery of the combustion chamber to produce a stratified exhaust and air-fuel mixture wherein the exhaust gas rotates about the cylinder axis substantially parallel to a plane normal to the cylinder axis and remains substantially along an interior wall of the cylinder and the air-fuel mixture rotates about the cylinder axis substantially parallel to the plane and occupies a portion of the piston surface and the remaining portion of the combustion chamber.

33. The method of claim 29 further comprising the steps of:
sensing an intake air mass flow rate;
sensing at least one engine operating condition related to engine load and deriving an engine load value from each sensed engine operating condition related to load;
sensing an exhaust manifold absolute pressure; and
sensing an exhaust gas temperature,
wherein the step of inducting the air-fuel mixture through the intake port into the combustion chamber comprises inducting the air-fuel mixture through the intake port into the combustion chamber in an amount dependent on the engine load value and the sensed intake air mass flow rate towards a cylinder axis extending in the direction of movement of the piston within the combustion chamber, and
wherein the step of inducting an exhaust residual through the exhaust port comprises inducting an exhaust residual through the exhaust port in an amount dependent on the engine load value, the sensed exhaust manifold absolute pressure and the sensed exhaust gas temperature near the outer periphery of the combustion chamber to produce a stratified exhaust and air-fuel mixture wherein the exhaust gas rotates about the cylinder axis and remains substantially along an interior wall of the cylinder and the air-fuel mixture rotates about the cylinder axis and occupies a portion of the piston surface and the remaining portion of the combustion chamber.

34. A method of inducting exhaust residual gas and intake air to produce a stratified exhaust gas and air-fuel mixture in a combustion chamber of an engine having a variable valve lift and timing system, the combustion chamber being defined by a cylinder, a cylinder head, and a piston moveable within the cylinder, and the engine having an intake port and an exhaust port each in fluid communication with the combustion chamber, the method comprising the steps of:
inducting air through the intake port into the combustion chamber towards a cylinder axis extending in the direction of movement of the piston within the combustion chamber;
injecting fuel into air in the combustion chamber to produce an air-fuel mixture; and
inducting an exhaust residual through the exhaust port near the outer periphery of the combustion chamber to produce a stratified exhaust gas and air-fuel mixture wherein the exhaust gas rotates about the cylinder axis and remains substantially along an interior wall of the cylinder and the air-fuel mixture rotates about the cylinder axis and occupies a portion of the piston surface and the remaining portion of the combustion chamber.

35. The method of claim 34 wherein:

the step of inducting air through the intake port into the combustion chamber and the step of inducting an exhaust residual through the exhaust port occur substantially simultaneously.

36. The method of claim 34 wherein:

the step of inducting the air through the intake port into the combustion chamber comprises inducting the air through the intake port and directing the air into the combustion chamber towards a cylinder axis extending in the direction of movement of the piston within the combustion chamber, and the step of inducting an exhaust residual through the exhaust port comprises inducting an exhaust residual through the exhaust port and directing the exhaust gas residual tangentially near the outer periphery of the combustion chamber to produce a stratified exhaust and air-fuel mixture wherein the exhaust gas rotates at an angular velocity about the cylinder axis and remains substantially along an interior wall of the cylinder and the air-fuel mixture rotates at the angular velocity about the cylinder axis and occupies a portion of the piston surface and the remaining portion of the combustion chamber.

37. The method of claim 34 wherein:

the step of inducting the air through the intake port into the combustion chamber comprises inducting the air through the intake port and directing the air into the combustion chamber towards a cylinder axis extending in the direction of movement of the piston within the combustion chamber, and the step of inducting an exhaust residual through the exhaust port comprises inducting an exhaust residual through the exhaust port and directing the exhaust gas residual tangentially near the outer periphery of the combustion chamber to produce a stratified exhaust and air-fuel mixture wherein the exhaust gas rotates about the cylinder axis substantially parallel to a plane normal to the cylinder axis and remains substantially along an interior wall of the cylinder and the air-fuel mixture rotates about the cylinder axis substantially parallel to the plane and occupies a portion of the piston surface and the remaining portion of the combustion chamber.

38. The method of claim 34 further comprising the steps of:

sensing an intake air mass flow rate;

sensing at least one engine operating condition related to engine load and deriving an engine load value from each sensed engine operating condition related to load;

sensing an exhaust manifold absolute pressure; and sensing an exhaust gas temperature, wherein the step of inducting the air through the intake port into the combustion chamber comprises inducting the air through the intake port into the combustion chamber in an amount dependent on the engine load value and the sensed intake air mass flow rate towards a cylinder axis extending in the direction of movement of the piston within the combustion chamber, and wherein the step of inducting an exhaust residual through the exhaust port comprises inducting an exhaust residual through the exhaust port in an amount dependent on the engine load value, the sensed exhaust manifold absolute pressure and the sensed exhaust gas temperature near the outer periphery of the combustion chamber to produce a stratified exhaust and air-fuel mixture wherein the exhaust gas rotates about the cylinder axis and remains substantially along an interior wall of the cylinder and the air-fuel mixture rotates about the cylinder axis and occupies a portion of the piston surface and the remaining portion of the combustion chamber.

* * * * *

UNITED STATES PATENT AND TRADEMARK OFFICE
CERTIFICATE OF CORRECTION

PATENT NO. : 6,318,348 B1
DATED : November 20, 2001
INVENTOR(S) : Min Xu

Page 1 of 1

It is certified that error appears in the above-identified patent and that said Letters Patent is hereby corrected as shown below:

Column 5,
Line 5, "Intake" should read -- intake --.

Column 10,
Line 61, "wefting" should read -- wetting --.

Column 11,
Line 30, "swiding" should read -- swirling --.

Signed and Sealed this

Nineteenth Day of March, 2002

Attest:

JAMES E. ROGAN
Director of the United States Patent and Trademark Office

Attesting Officer